United States Patent [19]

Åhlén

[11] 4,397,525

[45] Aug. 9, 1983

[54] DEVICE FOR DIVIDING A LASER BEAM

[75] Inventor: Hans O. S. Åhlén, Sollentuna, Sweden

[73] Assignee: Institutet för Optisk, Stockholm, Sweden

[21] Appl. No.: 346,041

[22] PCT Filed: May 26, 1981

[86] PCT No.: PCT/SE81/00156
§ 371 Date: Jan. 26, 1982
§ 102(e) Date: Jan. 26, 1982

[87] PCT Pub. No.: WO81/03551
PCT Pub. Date: Dec. 10, 1981

[30] Foreign Application Priority Data

May 28, 1980 [SE] Sweden .................................. 8003968

[51] Int. Cl.³ ................................................ G02B 5/18
[52] U.S. Cl. ............................ 350/162.17; 350/162.23; 350/171
[58] Field of Search .......................... 350/162, 169–174

[56] References Cited

U.S. PATENT DOCUMENTS 3,095,475  6/1963  Brake ............................... 350/162.17
4,195,909  4/1980  Holle et al. ...................... 350/162.17

Primary Examiner—Bruce Y. Arnold
Assistant Examiner—William Propp
Attorney, Agent, or Firm—Burns, Doane, Swecker & Mathis

[57] ABSTRACT

A device for dividing a laser beam, e.g. into parallel equidistant beams includes a glass plate with two opposing planer, parallel surfaces. A transmission grating is arranged on one glass surface. A reflecting layer is applied over the grating, and an opening is arranged in the layer at half the length of the plate, for taking the beam, which is to be divided, to and through the grating. The laser wavelength and the grating line density are selected to give total reflection at the free surface of the glass for a beam diffracted at the opening of the grating. By altering the angle of incidence of the beam, the distance between the subdivided beams can be continuously varied within given limits. The device is also utilizable for combining a plurality of separate beams into a single beam. (FIG. 3).

10 Claims, 7 Drawing Figures

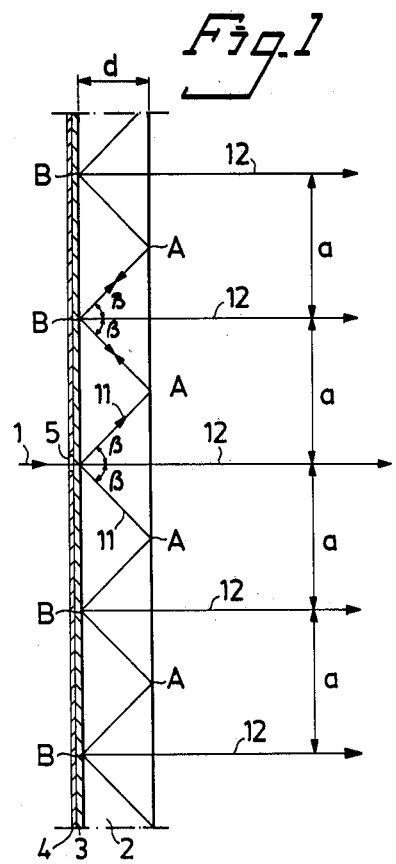
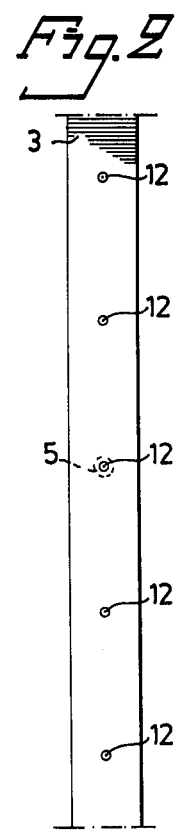
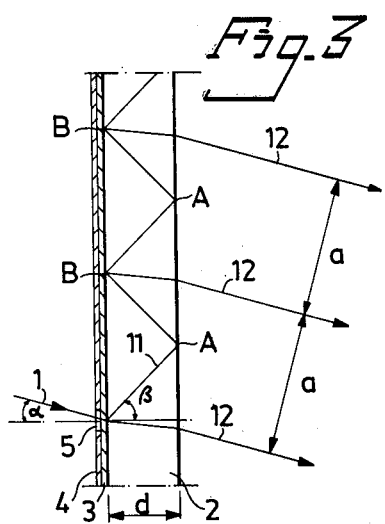
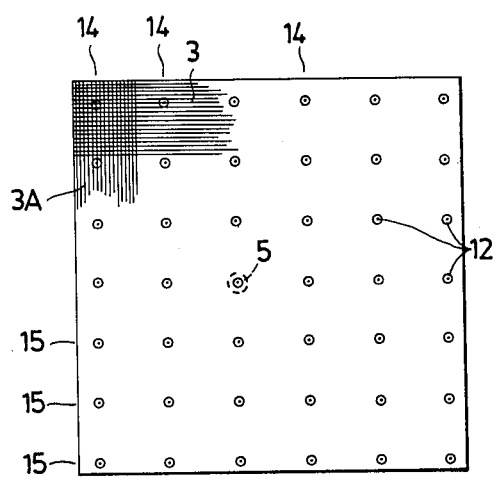

DEVICE FOR DIVIDING A LASER BEAM

BACKGROUND OF THE INVENTION

1. Technical Field

The invention relates to a device for subdividing a light beam, preferably a laser beam into a plurality of preferably parallel and equidistant beams, or for combining a plurality of beams into one beam.

2. Description of Prior Art

Translucent mirrors can conceivably be utilized to subdivide a laser beam into parallel beams, these mirrors being arranged at predetermined mutual spacing after each other in the path of the beam which is to be divided. These mirrors are then arranged mutually parallel and at an oblique angle to the path of the beam. At each such mirror, a part of the beam will be deflected and another part of it will be transmitted through the respective mirror. The reflected beams will be parallel if the mirrors can be adjusted to mutual parallelism, and the distance between the reflected beams can be made equidistant by making the mutual spacing between the parallel mirrors constant. Such an apparatus is, however, extremely difficult to adjust for providing a division of the laser beam into parallel equidistant beams, and it is hard to conceive that it could be practically usable.

It is previously known, for the object of giving a laser pulse a desired pulse shape, to divide a laser beam into parallel beams with the aid of a so-called beam divider and a mirror, which are arranged parallel and at given mutual spacing. In such apparatus, as will be seen from the British Patent Specification No. 1 440 538, parallelism is however dependent on how accurate the parallelism between mirror and divider can be set, and furthermore, the intensity of the divided beams is dependent on how exactly the dividing ability of the beam divider is managed. Apparatus of the type covered by the patent specification mentioned cannot conceivably be usable in applications wherein the apparatus is subjected to different forms of stress, nor can the apparatus be conceived as capable of being produced to a low cost.

There is also a need of apparatus by which a plurality of light beams can be combined into a single light beam; and the construction of such apparatus could correspond completely to the beam dividing apparatus discussed above.

One object of the invention is therefore to provide a device of the type mentioned in the introduction, which has a durable construction and can afford a high degree of parallellism and equidistance between divided beams or the reverse, can be produced at low cost, can afford an ease of adjustment in varying the distance between the divided beams, or beams which are to be put together, and can afford the possibility of generating an array or a matrix of beams, which can thereby advantageously be parallel and equidistant in rows, or can afford the possibility of combining a matrix of such beams into a single beam.

SUMMARY OF THE INVENTION

The inventive device for subdividing a light beam, preferably a laser beam, into a plurality of preferably parallel and equidistant beams, or for combining a plurality of beams into one beam, is substantially distinguished by a transparent substrate with two planar parallel surfaces, a grating on one of the two said surfaces of the substrate, and a reflecting layer on the side of the grating facing away from the substrate, a beam diffracted by the grating being arranged for total reflection at the second of the substrate's two said surfaces. The grating lines are preferably parallel and equidistant, whereby the light beam which is to be divided is divided into parallel equidistant beams, or parallel equidistant beams can be put together to a single beam. The line density of the grating and the refractive index of the substrate are selected for providing total reflection at said second substrate surface of a beam diffracted by the grating, for a given wavelength of the beam and a given maximum angle of incidence to the grating for the beam which is to be divided, or for the beams which are to be combined. An input can be arranged for entry of the beam which is to be divided to the grating, this input, in accordance with the discussion above, similarly functioning as output for a beam combined in the device from a plurality of beams.

The input can be formed by an opening or recess in the reflecting layer, the beam which is to be divided being arranged for entry through the input, through the grating and towards the substrate, or the beam combined in the device from a plurality of beams being arranged for passing out through the grating and through said opening or recess.

As an alternative, the input may be formed by the reflecting layer being arranged over a limited surface section of the grating, a beam which is to be divided being taken through the substrate and grating towards said reflecting surface section, and the beam combined in the device from a plurality of beams is led away from the surface section via the grating and out through the substrate.

In the second case, the reflecting layer covers substantially the whole of the grating, the beam which is to be divided or the beam combined in the device from a plurality of beams, being arranged for entry through the substrate and the grating towards the reflecting coating, or exiting via the grating and out through the substrate.

To advantage, the grating can be made with a greater efficiency (deeper) at the input than in an area surrounding the input.

If so desired, the grating can comprise two or more sets of lines crossing each other, the lines in each set preferably being parallel and equidistant, whereby a beam can be divided into a field of parallel equidistant beams in rows, or a field of parallel equidistant beams in rows can be combined to a single beam.

It should however be noted that the grating can be made with grating lines which are not parallel, and/or lines which are not straight and/or with varying distances between the lines, whereby a beam can be divided into a plurality of beams, the mutual distance of which at the surface of the device, and their direction relative thereto being determined by the mode of embodiment for the grating, or where a plurality of beams which are incident on the device with different mutual distances and/or directions can be combined to a single beam.

It will be further noted that by varying the profile depth of the grating over the surface of the device, a nearly arbitrary intensity distribution can be developed between divided beams.

It should also be particularly noted that a grating with more than two sets of grating lines can be used. It will thus be possible, for example, to produce from a single beam an array of beams which form a selected spot pattern.

The substrate can comprise so-called float glass, the chief surfaces of which form said planar, parallel surfaces. Float glass is commercially available and has a very high degree of parallellism between its surfaces, and can be utilized as initial material in manufacturing the inventive device. The glass is cut to a size suitable for the purpose, the grating or gratings being applied to one surface of the glass plate by some suitable method, e.g. holographic exposure and photo-resistance etching. This grating can then be made as a transmission grating. A reflecting coating is then applied to the grating, e.g. by silver being applied through vaporization, a recess or opening suitably being arranged in the reflecting coating.

The parallellism of the beams is determined by how flat the substrate is. In altering the angle of incidence of the laser beam to the grating it is possible continuously to vary the distance between the beams, while the beams remain parallel and equidistant. For a given substrate and a given wavelength of the laser beam, the desired distance between the beams can be provided by suitable selection of the grating frequency (pitch of the lines) and/or thickness of the substrate.

The intensity of the beams can be selected by making the grating with a suitable efficiency, e.g. by suitable selection of the grating profile depth.

The inventive device can be made with very small dimensions. In the case where the laser beam is only to afford a row of divided beams, the width of the device is determined by the maximum diameter of the laser beam, and its length by the desired distance between the outmost beams in the row. The thickness of the device often only attains some millimeters. In the case where the device is to afford a field of beams, its superficial dimensions are determined by the distance between the outmost beams in crossing rows.

The device in accordance with the invention has many fields of application. It can thus be utilized for educational purposes to demonstrate the path of rays in optical components. It can also be utilized for general measuring purposes. It can further be used for inspection purposes (shadowing). It can even be used as a so-called beam expander, which signifies that a beam is divided up into a plurality of parallel beams having small mutual spacing, so that they practically define a straight line. This constitutes a considerable simplification of previous attempts to provide a "band of light", when it was necessary to utilize an oscillating deflection mirror and when poorer light intensity was obtained.

Furthermore, two substantially like devices in accordance with the invention can be utilized for digital indication of lateral displacement. The condition here is that the beam-combining (receiving) device has an "output" with small dimensions relative the combined emitted beam. There is thus obtained an emitted combined light beam only when the receiving device is in discrete lateral displacement positions relative to the beam-dividing device. By using the device to provide parallel lines or even a matrix of parallel lines, possibly equidistant lines in rows, a dot system can be established which finds use in sawmills, for example, when it is desired to optimilize the quantity of sawn products which can be obtained from a log. Further, corresponding device can be utilized in industrial and workshop operations for setting out saw cuts, drilling positions etc.

The device can furthermore be utilized for so-called multiplexing, and by providing line fields or grids with special configurations it can be utilized to great advantage for testing lenses.

The invention is naturally not confined to the abovementioned uses, since one skilled in the art will immediately observe that many other applications are discernable.

It is here particularly emphasized that the grating lines do not need to be of constant direction and density, and neither will the beams then be parallel and equidistant in rows.

Any equivalent diffracting apparatus can be used to substitute for the grating, even holograms, so that any kind of light distribution can be generated (within the condition of total reflection and conditions for defraction geometry), e.g. even dot spirals or image multiplexing.

The invention is defined in the appended claims.

The invention will now be described in the following in the form of an example while referring to the accompanying drawing.

BRIEF DESCRIPTION OF THE DRAWINGS

FIG. 1 schematically illustrates a longitudinal section through a device in accordance with the invention.

FIG. 2 is a front view of the device according to FIG. 1.

FIG. 3 is a schematic longitudinal section through a device in accordance with the invention, and FIG. 4 is a front view of an alternative device in accordance with the invention.

PREFERRED EMBODIMENT OF THE INVENTION

Figure 5:
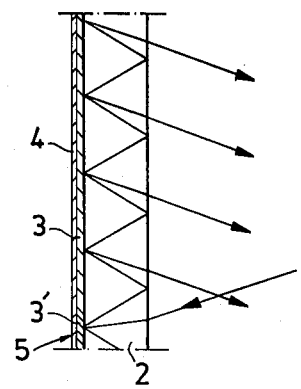
FIGS. 5-7 are examples of other embodiments of the invention.

In FIGS. 1 and 2 there is shown a float glass plate 2 on which a grating 3 is arranged. A reflecting layer 4 is applied to the grating 3. An opening 5 is arranged through the layer 4.

A laser beam 1, which is to be divided, is taken normal to the main surfaces of the substrate 2 through the opening 5. The grating 3 is made as a transmission grating, and at the opening 5 the beam 1 is divided into three components. A first component is transmitted straight through the grating and forms a beam 12, which constitutes a straight continuation of the beam 1. The beam 1 will further be defracted by the grating 3 to form two beams 11. These two beams 11 extend at an angle $\beta$ to the path of the beam 1. At the points A, the beams 11 will be totally reflected and redirected to the grating 3 at the points B. The grating 3 is there provided with a reflecting material so that if functions as a reflection grating. At the points B, the incident beam is divided into three parts. A first part is reflected at the angle $\beta$. A second part 12 is diffracted perpendicular to the grating 3 and a third part is reflected back along the original path. At the points B the perpendicularly diffracted light 12 is parallel to the beam 1 and the undeflected transmitted component 12 of the beam 1. Of the light which is reflected at a point B there occurs the same division in a closely adjacent point B as in the first-mentioned point B, whereby a further parallel beam 12 is created. This division is repeated an arbitrary number of times, both upwards and downwards in FIG. 1.

A tested embodiment of a device in FIGS. 1 and 2 had the following data:

Wavelength λ of laser beam 1=632.8 mm
Thickness d of float glass 2=8 mm
Length of glass 2=110 mm
Width of glass 2=10 mm
Refractive index n of glass 2 =1.52
Line density ν of grating 3=1800 lines/mm
Reflecting coating 4—silver (applied by vaporization)
In this case the following values were obtained:
β=arcsin (λ·ν/n)=48.5°, where
a=distance between beams 12=2 d tan β=18.1 mm, when the beam 1 was incident normal to the grating 3.

The opening 5 was situated at half the length of the glass 2, whereby seven parallel beams 12 were formed.

In FIG. 3 there is shown the ray path for a case where the beam 1, which is to be divided, has an angle of incidence=α to the grating 3. The following relationship is generally applicable:

$$a = 2\, d \tan [\arcsin (\lambda \cdot \nu/n - \sin \alpha/n)] \cos \alpha$$

where
d=substrate thickness
λ=laser leight wavelength
n=substrate refractive index
ν=grating line density (lines per length unit)
α=angle of incidence of laser beam 1.

The condition for total reflection at A is $\nu > (1+\sin \alpha)/\nu$ this condition limiting α to $\alpha > \arcsin (\nu\sqrt{\lambda}-1)$.

For the tested embodiment according to the above, a can be continually varied between 13.8 mm and 55 mm by varying α between 8° and −19°.

In FIG. 4 there is shown a front view of an embodiment of a device with two gratings 3 and 3A, intersecting each other at right angles. The opening 5 is arranged substantially centrally. The divided beams 12 are parallel and equidistant in rows. The distance between the beams 1 in the rows 14 is in response to the line density of the grating 3. The distance between beams in the rows 15 are in response to the line density A of the grating 3A. FIG. 5 illustrates an embodiment where the beam 1, which is to be divided, is taken in through the substrate 2 and through a deeper grating portion 3', and then to the reflecting layer 4, whereafter diffracted rays eventually coact with a shallower grating portion 3 surrounding the "input" 5.

Figure 6:
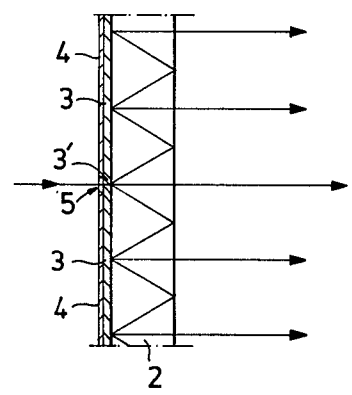
Figure 7:
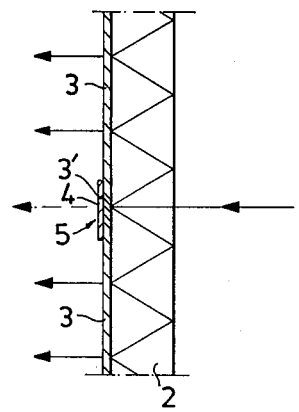

In FIG. 6 there is illustrated a device with a deeper grating portion 3' at the input 5, the beams extending normal to the surface of the substrate 2. FIG. 7 illustrates an embodiment in which a relatively deep grating 3' is applied at the "input" 5, a reflecting layer 4 being only applied in the area of the input 5 over the deep grating 3'. A shallower grating is arranged in the area surrounding the deep grating. A beam which is to be divided is then led through the substrate through the deep grating 3', and towards the partially reflecting surface section 4 in the manner shown.

Although the invention above has been described as a device for dividing a beam into a plurality of beams, it should be quite clear that the invention can just as well be utilized for the reverse purpose, namely for combining a plurality of beams into a single beam, providing the beams which are to be combined, meet the geometrical conditions given above.

I claim:

1. Device for dividing a light beam into a plurality of beams, or for combining a plurality of beams into a beam, characterized by a transparent substrate with two planar parallel surfaces, a grating on one of the two said surfaces of the substrate, and a reflecting layer on the side of the grating facing away from the substrate a beam diffracted by the grating being arranged for total reflection at the other of the substrate's two said surfaces.

2. Device as claimed in claim 1, characterized in that the grating lines are parallel and equidistant, whereby the light beam, which is to be divided, is divided into parallel equidistant beams, or parallel equidistant beams can be combined to a single beam.

3. Device as claimed in claim 1, characterized in that the grating lines are made with non-parallel lines and/or lines which are not straight and/or varying line spacing, whereby a beam can be divided into a plurality of beams, the mutual spacing of which at the surface of the device, or whose direction relative to the device is determined by the configuration of the grating, or whereby a plurality of beams incident to the device and having different mutual spacing and/or directions can be combined into a single beam.

4. Device as claimed in claim 1 or 2, characterized in that the grating line density (ν) and the refractive index (n) of the substrate are selected such that for a given wavelength (λ) of the beam and for a given maximum angle of incidence (α) to the grating for the beam, which is to be divided, or for the beams which are to be combined, a total reflection at the second said surface of the substrate is provided for a beam diffracted by the grating.

5. Device as claimed in any one of claims 1, 2 or 4, characterized in that an input is arranged for entry of the beam, which is to be divided, to the grating, said input also functioning as the output for the beam combined in the device from a plurality of beams.

6. Device as claimed in claim 5, characterized in that the input is formed by an opening or recess in the layer whereby the beam, which is to be divided, is arranged for leading through the input, through the grating and towards the substrate, or the beam, combined in the device from a plurality of beams, is arranged for exiting through the grating and through said opening or recess.

7. Device as claimed in claim 3, characterized in that the reflecting layer covers substantially the whole of the grating and that the beam, which is to be divided, or the beam combined in the device from a plurality of beams is arranged for taking in through the substrate and the grating towards the reflecting coating or for leading away via the grating and out through the substrate.

8. Device as claimed in claim 5, characterized in that the grating is made with a higher efficiency at the input than at an area surrounding the input.

9. Device as claimed in claim 1 or 5, characterized in that the input is formed such that the reflecting layer is arranged over a limited surface section of the grating, whereby a beam, which is to be divided, is taken through the substrate and grating towards said surface section, or that the beam combined in the device from a plurality of beams is taken from the surface section via the grating and out through the substrate.

10. Device as claimed in any one of claims 1, 2, 4, 8 or 9, characterized in that the grating includes two or more sets of lines intersecting each other, the lines in each set of lines preferably being parallel and equidistant, whereby a beam can be divided into a field of parallel equidistant beams arranged in rows, or a field of parallel equidistant beams arranged in rows can be combined into a single beam.

* * * * *